United States Patent Office 3,832,334
Patented Aug. 27, 1974

3,832,334
CYANOACRYLATE ADHESIVE COMPOSITIONS HAVING IMPROVED THERMAL RESISTANCE
Denis J. O'Sullivan and David P. Melody, Dublin, Ireland, assignors to Loctite (Ireland) Limited, Dublin, Ireland
No Drawing. Filed Dec. 29, 1971, Ser. No. 213,839
Int. Cl. C08f 15/02
U.S. Cl. 260—78.5 R                11 Claims

ABSTRACT OF THE DISCLOSURE

Cyanoacrylate adhesive compositions containing maleic anhydride produce rapid bonds which possess increased thermal resistance.

BACKGROUND OF THE INVENTION

This invention deals with polymerizable cyanoacrylate adhesives, compositions containing as a major active ingredient at least one monomeric ester of 2-cyanoacrylic acid. These compositions are stabilized to prevent premature or spurious polymerization prior to the time of intended use.

Cyanoacrylate adhesive compositions are extremely sensitive, and great care must be exercized in their formulation. Cure (polymerization) is generally considered to be initiated by an anionic mechanism, with water being a sufficiently strong base to initiate cure under most circumstances. The adhesives remain shelf stable items of commerce as long as they are suitably packaged, but when placed on a substrate to be bonded and exposed to atmospheric and surface moisture in so doing, cure generally is instituted in a relatively short period of time, generally in less than one minute, and on many surfaces within a matter of a few seconds. Typical examples of patents relating to cyanoacrylate adhesives are U.S. Pats. 2,784,215 to Joyner, issued Mar. 5, 1957, and 2,794,788 to Coover et al., issued June 4, 1957, and British Pat. 1,196,069 to O'Sullivan, published June 24, 1970.

This exceptional cure speed offers numerous advantages, particularly to those whose use adhesive bonding in production line applications. However, a major shortcoming which has heretofore limited the areas of applicability of cyanoacrylate adhesives has been the relatively low thermal resistance of the cured bonds. Bonded assemblies frequently are exposed to continuous operating temperatures substantially above normal room temperature, and the adhesive assembly must retain reasonable strength for substantial periods of time at these elevated temperatures to retain its usefulness.

In addition to strength retention by the adhesive at elevated temperatures (i.e., hot strength), the adhesive bonds must not be unduly affected by continuous or repeated exposure to elevated temperatures (resistance to heat degradation). In the prior art it has not been possible to prepare a cyanoacrylate adhesive composition which produced substantial cross linking on cure, even when ostensibly difunctional cyanoacrylate monomers (such as allyl-2-cyanoacrylate) were used. Further, because of the extreme reactivity of the cyanoacrylate monomer, there have been substantial limitations upon addition of other ingredients, such as cross linking agents or co-monomers, in order to improve the above-described thermal properties.

A cyanoacrylate adhesive composition which possessed improved thermal properties, such as those described above, would provide a major advance in adhesive technology, and provide novel and extremely useful adhesive compositions.

THE INVENTION

This invention concerns adhesive compositions comprising one or more monomeric esters of 2-cyanoacrylic acid, and at least about 0.1% of a maleic anhydride by weight of the adhesive composition. These compositions additionally contain an inhibitor of anionic polymerization, but the specific inhibitor chosen is not material for the broad purposes of this invention.

The maleic anhydride additive does not produce undue stability problems in the cyanoacrylate adhesive composition, and hence can be added at the time of manufacture. However, also included within the broad scope of this invention are adhesive compositions prepared in situ by addition of the maleic anhydride at the time of use, or by pretreating the surface or surfaces to be bonded with maleic anhydride as a "surface primer," rather than by direct addition of the maleic anhydride to the remainder of the adhesive ingredients.

In another aspect, this invention concerns bonded assemblies having improved thermal resistance properties comprising an assembly of at least two members or substrates, said members or substrates being bonded by a thin film of the cured cyanoacrylate adhesive described above.

This invention also concerns the improvement of conventional cyanoacrylate adhesive compositions by the addition thereto of at least about 0.1% by weight maleic anhydride, as well as improved bonding processes which involve the use of the above-described improved cyanoacrylate adhesive compositions.

While the specific mechanisms and reasons for the improvements are not known in detail, it has been found that adhesives and adhesive bonds prepared as disclosed herein, have substantially greater thermal resistance properties than have been achieved in the prior art.

DISCUSSION OF THE INVENTION AND ITS PREFERRED EMBODIMENTS

The benefits of this invention are achievable with essentially all adhesive compositions based upon monomeric esters of 2-cyanoacrylic acid. Most commonly, the esters have the formula

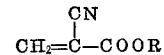

wherein R represents a $C_{1-16}$ alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhesive compositions, such as strongly basic substituents which may adversely affect the stability of the adhesive composition. For purposes of this invention, the preferred monomers are those wherein R is a $C_1$ to $C_4$ alkyl or alkenyl radical, since with these esters the optimum increases in thermal resistance properties have been achieved.

The above monomeric esters of 2-cyanoacrylic acid can be prepared by methods known in the art, such as those described in U.S. Pats. 2,467,927 to Ardis, issued Apr. 9, 1949 and 3,254,111 to Hawkins et al., issued May 31, 1966. The esters may be used singly or in combination to form the cyanoacrylate adhesive.

As indicated above, the improvements in thermal properties are achieved by incorporating a maleic anhydride in the cyanoacrylate adhesive (either as a direct additive or as a separately applied additive to the surface at the time of bonding). As used herein, "a maleic anhydride" includes not only the specific compound of the formula

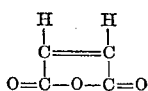

(which specific compound is the single most desirable additive for use in the compositions of this invention), but also any derivative thereof wherein one or both of the hydrogen atoms are replaced by a substituent which does not produce stability problems in the composition as a whole, or so alter the nature of the maleic anhydride molecule as to render it ineffective for its intended purposes. For example, either or both of the hydrogen atoms may be replaced by the group $R^1$, wherein $R^1$ is a chloro, bromo or iodo radical, or an alkyl, cycloalkyl, alkenyl or cycloalkenyl substituent containing up to about 8 carbon atoms. Preferably, $R^1$ is chloro, bromo or an alkyl or alkenyl group containing up to about 4 carbon atoms. Particularly preferred substituents are chloro, bromo and methyl.

In another aspect, when substituted maleic anhydrides are used, it is highly preferable for only one of the hydrogen atoms to be replaced by an $R^1$ substituent. It appears that steric factors render the disubstituted compounds substantially less effective than the monosubstituted compounds.

The maleic anhydride additives are used at a minimum level of about 0.1% by weight of the adhesive composition. Preferably, the level is at least about 0.25% and, most preferably, about 0.5% since it is at these preferred levels that the clearly superior improvements in thermal properties are achieved. The upper limit in most cases will be determined by questions of solubility and practicality. While higher levels such as 10% by weight of the adhesive compositions can be used, in essentially all cases little if any additional benefit can be achieved by the use of more than about 5%. A preferred upper limit is about 2% by weight.

In addition to the above-named ingredients, the cyanoacrylate adhesive compositions additionally contain an anionic inhibitor, e.g., an acidic substance, soluble in the ester of 2-cyanoacrylic acid, which inhibits anionic polymerization. As explained previously, the specific inhibitor chosen is not critical to this invention, and a number of suitable inhibitors of anionic polymerization are well known in the art.

The earliest of these are the soluble acidic gases such as sulfur dioxide, sulfur trioxide, nitric oxide, and hydrogen fluoride. More recently, organic sultone inhibitors have been developed, the sultone being generally represented by the formula

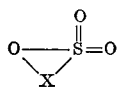

wherein X is an organic radical joining the —S(O₂)O— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKa value (dissociation constant in water) of less than about 2.8, and preferably less than about 1.5.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxy phenol, etc.

The above inhibitors may be used within wide ranges, but the following general guidelines are representative of common practice, all figures being weight percent of the adhesive composition: acidic gases—from about 0.001% to about 0.06% by weight; sultones—from about 0.1% to about 10% by weight; sulfonic acids—from about 0.0005% to about 0.1% by weight; free radical inhibitors—from about 0.001% to about 1%.

Other common additives for cyanoacrylate adhesive compositions are plasticizers and thickeners. Plasticizers serve to make the cured bonds less brittle and, therefore, more durable. The most common of these plasticizers are $C_1$ to $C_{10}$ alkyl esters of dibasic acids such as sebacic acid and malonic acid. Other plasticizers, such as diaryl ethers and polyurethanes, also may be used.

Thickeners increase the viscosity of the adhesives and render them capable of greater retention on parts to be bonded, and particularly better able to fill larger gaps between such parts. A number of such thickeners are known for use in combination with cyanoacrylate adhesives, the most common of which are acrylate resins such as polymethylmethacrylate and polyethylmethacrylate. Other suitable thickeners include polymeric alkylcyanoacrylates, cellulose esters such as cellulose acetate and cellulose butyrate, and polyvinyl ethers such as polyvinylmethyl ether.

Compositions of this invention are prepared from the original starting materials by a conventional mixing operation, although moderate heating may be helpful to achieve solution of the ingredients within a reasonable time.

As indicated above, the maleic anhydride may be added to the cyanoacrylate composition at the time of manufacture, or at some later date prior to use of the adhesive composition. Alternatively, the maleic anhydride can be applied as a "surface primer" separately prior to the application of the cyanoacrylate adhesive. It appears that adequate intermixing of the ingredients is achieved during the bonding operation to provide significant improvements in the thermal resistance properties discussed above.

When used in the surface primer fashion, the maleic anhydride generally is dissolved in a volatile solvent, typical examples of which are the chlorinated solvents such as methylene chloride, 1,1,1-trichloroethane, and trichloroethylene. The primer is sprayed onto one or more of the surfaces to be bonded, and the volatile solvent allowed to evaporate. Thereafter the cyanoacrylate adhesive is applied, the parts are placed in abutting relation and the adhesive allowed to cure in the normal fashion.

Bonded assemblies prepared with the cyanoacrylate adhesives of this invention possess unique and superior properties relative to assemblies prepared with prior art cyanoacrylate adhesive compositions. Substantially increased durability and strength are achieved in the face of elevated and variable temperature conditions.

EXAMPLES

The following examples are given to demonstrate processes and compositions within the scope of the invention disclosed herein. The examples are not intended to be limitations upon the scope of the invention. Unless specifically stated to the contrary, all ratios and percentages in the Examples are on a weight basis.

Example I

Two separate batches of methyl-2-cyanoacrylate monomer were used to prepare cyanoacrylate adhesive compositions. Each batch contained, as stabilizers, 0.5% by weight propane sultone and 0.01% by weight hydroquinone. The first batch of the methyl-2-cyanoacrylate was divided into three parts, and designated Adhesives A, B and C, respectively. Adhesive A was allowed to remain unaltered as a "Control." Approximately 0.6% by weight maleic anhydride and approximately 1.2% by weight maleic anhydride were added to Adhesives B and C, respectively.

The second batch of methyl-2-cyanoacrylate was divided into two portions; the first was designated Adhesive D and allowed to remain unaltered as a second "Control" sample. Approximately 0.8% by weight maleic anhydride was added to the second portion, which was then designated Adhesive E.

Each of these five cyanoacrylate adhesives then was used to bond a series of 1 inch by 5 inch by 1/16 inch thick steel lap strips. The bonded assemblies then were tested according to ASTM Test D1002–64 to determine the thermal resistance characteristics of the bonds prepared with the various adhesives.

To form the assemblies, a drop of the adhesive in question was placed near the end of one of the lap strips, and the mating surface of the second lap strip was placed thereover in an aligned relationship with a one-inch overlap. It was found that within substantially less than a minute a firm bond was obtained. All the bonds were allowed to age overnight at room temperature before testing to guarantee that essentially full cure had taken place. Thereafter, the assemblies were aged for 24 hours at 100° C., and then were allowed to return to room temperature, after which the tensile-shear force required to separate the bonded assemblies was determined. This test is designated to be a measurement of the resistance of the adhesive to heat degradation. The results are presented below in Table I.

TABLE I

Tensile Shear Strength of Bond (Age 24 hrs. @ 100° C.; Test at Room Temp.),

Adhesive and Percent Maleic Anhydride: lbs./sq. in.
- A (0%) — 460
- B (0.6%) — 1650
- C (1.2%) — 3000
- D (0%) — 620
- E (0.8%) — 2450

Example II

Three cyanoacrylate adhesive compositions were prepared, each using a different monomeric ester of 2-cyanoacrylic acid. The monomeric esters were, respectively, methyl-2-cyanoacrylate, ethyl-2-cyanoacrylate and allyl-2-cyanoacrylate. In each case the monomer contained 0.5% by weight propane sultone and 0.01% by weight hydroquinone. One half of each adhesive was set aside to serve as "Control" samples, and 1% by weight maleic anhydride was added to each of the other three portions.

Each of these adhesives then were used to prepare a series of bonded assemblies, substantially as described in Example I, above. Assemblies prepared by use of the various adhesives then were used in one or both of the following tests, which are designed to measure the strength of the adhesives at elevated temperatures. In the first test, the assemblies in question were aged for thirty minutes at 125° C., and the assemblies then were immediately transferred to a tensile tester. The tensile-shear force required to separate the assemblies was determined without allowing substantial cooling of the assembly to take place. In the second test, essentially the same procedure was followed as for the first test, except that the aging was conducted at 105° C.

The results of the tests are presented below in Table II.

TABLE II

| Adhesive monomer | Wt. percent maleic anhydride | Tensile shear strength of bond, lb./sq. in. | |
|---|---|---|---|
| | | Aged at 150° C. tested hot | Aged at 105° C, tested hot |
| Methyl-2-cyanoacrylate | 0 | 100 | 1,400 |
| | 1 | 2,650 | 2,950 |
| Ethyl-2-cyanoacrylate | 0 | 0 | 850 |
| | 1 | 1,450 | 1,950 |
| Allyl-2-cyanoacrylate | 0 | | 0 |
| | 1 | | 950 |

Example III

Three adhesive compositions were prepared substantially as described in Example II, above, except that the monomers were, respectively, ethyl-2-cyanoacrylate, allyl-2-cyanoacrylate and butyl-2-cyanoacrylate. Again, the adhesives were divided into two portions, one portion of each being allowed to remain as a "Control," and 1% maleic anhydride was added to each of the other three portions. A series of bonded assemblies were prepared, using these adhesives, substantially as described in Example I, above. Assemblies utilizing each adhesive then were subjected to at least one of three tests designed to determine resistance to heat degradation. The first test was the test described in Example I, above. The second test was substantially as described in Example I, above, except that the assemblies were aged at 120° C., and then returned to room temperature before testing. The third test was substantially as described in Example I, except that the assemblies were aged for one hour at 150° C., and then returned to room temperature for testing.

The results of these tests are presented in Table III, below.

TABLE III

| Adhesive monomer | Wt. percent maleic anhydride | Tensile shear strength of bond, lb./sq. in. (tested at room temperature) | | |
|---|---|---|---|---|
| | | Aged at 100° C. | Aged at 120° C. | Aged at 150° C. |
| Ethyl-2-cyanoacrylate | 0 | | 0 | |
| | 1 | | 2,250 | |
| Allyl-2-cyanoacrylate | 0 | 0 | | 0 |
| | 1 | 3,250 | | 1,450 |
| Butyl-2-cyanoacrylate | 0 | | 600 | 450 |
| | 1 | | 2,450 | 1,850 |

Example IV

A cyanoacrylate adhesive based on methyl-2-cyanoacrylate was prepared substantially as described in Example I. To this adhesive was added 1% by weight dioctyl sebacate and 3% polymethylmethacrylate, to produce a plasticized adhesive composition with a final viscosity of 100 centipoise. This adhesive then was divided into two portions, the first of which was allowed to remain unaltered to serve as a "Control" sample. To the second half was added 1% by weight maleic anhydride.

These adhesives then were used to prepare bonded assemblies as in the prior Examples, and tested as according to the "first test" and "second test" described above in Example III. The results of the tests are presented in Table IV, below.

TABLE IV

| | Tensile shear strength of bond, lb./sq. in. (tested at room temperature) | |
|---|---|---|
| | Aged at 100° C. | Aged at 120° C. |
| Adhesive plus 0% maleic anhydride | 0 | 0 |
| Adhesive plus 1% maleic anhydride | 2,450 | 1,600 |

Example V

A cyanoacrylate adhesive composition was prepared from methyl-2-cyanoacrylate monomer substantially as described in Example I, above. A portion of this adhesive was allowed to remain unaltered to serve as a "Control" sample. The remainder of the adhesive was divided into 5 portions, and to each of the 5 portions was added 1% by weight of a maleic anhydride within the scope of the invention disclosed herein. The various adhesive compositions then were used to prepare bonded assemblies substantially as described in Example I, above, and assemblies bonded with each of the adhesive compositions were tested under each of three different tests. The specific maleic anhydride which was used, the tests and the test results obtained are presented below in Table V.

TABLE V

| | Tensile shear strength of bond, lb./sq. in. | | |
|---|---|---|---|
| | Age 24 hrs. at 100° C., test at room temp. | Age 30 min. at 125° C., test immediately | Age 30 min. at 105° C., test immediately |
| Control adhesive | 650 | 400 | 1,400 |
| Control plus 1% maleic anhydride | 3,050 | 2,650 | 2,950 |
| Control plus 1% bromomaleic anhydride | 2,450 | 2,700 | 3,100 |
| Control plus 1% chloromaleic anhydride | 2,300 | 1,850 | 2,950 |
| Control plus 1% methylmaleic anhydride | 2,150 | 2,200 | 2,950 |
| Control plus 1% dichloro maleic anhydride | 1,300 | 1,900 | 2,150 |

We claim:

1. A cyanoacrylate adhesive composition which comprises at least one monomeric ester of 2-cyanoacrylic acid, and at least about 0.1% by weight of a maleic anhydride.

2. A cyanoacrylate adhesive composition which comprises at least one monomeric ester of 2-cyanoacrylic acid, and at least about 0.1% by weight of a maleic anhydride, wherein the ester of 2-cyanoacrylic acid has the formula

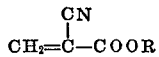

wherein R represents a $C_{1-16}$ alkyl, cycloalkyl, alkenyl, cycloalkenyl, phenyl or heterocyclic radical.

3. The composition of Claim 2 wherein the maleic anhydride has the formula

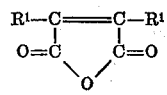

wherein each $R^1$ is a hydrogen, chloro, bromo or iodo radical, or an alkyl, cycloalkyl, alkenyl or cycloakenyl substituent containing up to about 8 carbon atoms.

4. The composition of Claim 3 wherein at least one of the $R^1$ groups is hydrogen.

5. The composition of Claim 4 wherein the anhydride comprises from about 0.25% to about 5.0% by weight of the adhesive composition.

6. The composition of Claim 3 wherein both $R^1$ groups are hydrogen.

7. The composition of Claim 2 wherein R is a $C_1$ to $C_4$ alkyl or alkenyl group.

8. The composition of Claim 2 which additionally contains an inhibitor of anionic polymerization.

9. The composition of Claim 8 wherein the inhibitor of anionic polymerization is selected from the class consisting of acidic gases, organic sultones and organic sulfonic acids.

10. The composition of Claim 8 which additionally contains an inhibitor of free radical polymerization.

11. The composition of Claim 8 wherein the anhydride comprises from about 0.25% to about 5.0% by weight of the adhesive composition.

References Cited

UNITED STATES PATENTS

| | | | |
|---|---|---|---|
| 3,701,758 | 10/1972 | Maska | 260—78.5 N |
| 3,697,618 | 10/1972 | Grunewalder et al. | 260—78.5 R |
| 3,692,752 | 9/1972 | Setsuda et al. | 260—78.5 N |
| 3,640,972 | 2/1972 | Bolger et al. | 260—78.4 N |

JOSEPH L. SCHOFER, Primary Examiner

J. KIGHT, Assistant Examiner

U.S. Cl. X.R.

156—325; 161—231; 117—122 PA, 161 UN

UNITED STATES PATENT OFFICE
CERTIFICATE OF CORRECTION

Patent No. 3,832,334　　　　　　　　Dated August 27, 1974

Inventor(s) Denis J. O'Sullivan and David P. Melody

It is certified that error appears in the above-identified patent and that said Letters Patent are hereby corrected as shown below:

At column 6, line 6 (Table II, third column) instead of "150°" read --125°--.

Signed and sealed this 5th day of November 1974.

(SEAL)
Attest:

McCOY M. GIBSON JR.
Attesting Officer

C. MARSHALL DANN
Commissioner of Patents